United States Patent [19]

Kerscher

[11] 4,215,652

[45] Aug. 5, 1980

[54] BIRD FEEDER

[76] Inventor: Clarence J. Kerscher, 2030 Eastbrook Dr., Toledo, Ohio 43613

[21] Appl. No.: 923,005

[22] Filed: Jul. 10, 1978

[51] Int. Cl.[2] .......................................... A01K 39/01
[52] U.S. Cl. .............................. 119/51 R; 119/52 R
[58] Field of Search ...................... 119/51 R, 52 R, 53

[56] References Cited

U.S. PATENT DOCUMENTS

| | | | |
|---|---|---|---|
| 2,524,502 | 10/1950 | Wilkinson | 119/51 R |
| 2,891,508 | 6/1959 | Bower | 119/51 R |
| 3,086,499 | 4/1963 | Dilley | 119/51 R |
| 3,090,354 | 5/1963 | Merritt et al. | 119/52 R |
| 3,186,379 | 6/1965 | Grella | 119/51 R |
| 3,316,884 | 5/1967 | Viggars | 119/52 R |
| 3,568,641 | 3/1971 | Kilham | 119/51 R |
| 3,645,235 | 2/1972 | Suchla | 119/51 R |
| 3,777,711 | 12/1973 | Gampp | 119/52 R X |

*Primary Examiner*—Louis G. Mancene
*Assistant Examiner*—Robert P. Swiatek
*Attorney, Agent, or Firm*—Wilson, Fraser, Barker & Clemens

[57] ABSTRACT

A bird feeder having a generally V-shaped centrally disposed feed hopper provided with a plurality of vertically spaced feed apertures having associated bird support members. A spilled feed receptacle is positioned below the feed apertures to collect any spilled feed exiting through any of the feed apertures.

10 Claims, 6 Drawing Figures

BIRD FEEDER

BACKGROUND OF THE INVENTION

Numerous bird feeders of various kinds have been described in the prior art. While certain advantages are offered by many of these prior art devices, such as wind oriented and marauder proof bird feeders, there is a need for a bird feeder which minimizes waste of feed which a bird may drop while in the process of feeding. A bird feeder of this type is especially important where relatively expensive feed such as thistle seed is utilized.

One type of prior art bird feeder which attempts to minimize waste of feed is disclosed in U.S. Pat. No. 3,316,884, issued to R. M. Viggars. This patent discloses a feeder having a centrally disposed feed chamber wherein the feed is dispensed around the bottom edges of the chamber. An annular channel having a plurality of holes in the bottom surface surrounds the bottom edges of the chamber and functions to catch a portion of the feed which the birds may drop. A seed catcher is positioned below the holes in the annular channel to catch any seed falling through the holes.

Another type of bird feeder which attempts to reduce spilling and scattering of feed is disclosed in U.S. Pat. No. 3,645,235 issued to J. R. Suchla. This patent discloses an enclosure having one open side covering a feed hopper. A bearing assemly rotatbly supports the feeder on an upright post while a wind vane extends from the open side of the enclosure so that the open side is always downwind.

SUMMARY OF THE INVENTION

It is an object of the present invention to produce a bird feeder for simultaneously feeding a plurality of birds.

It is another object of the present invention to produce a bird feeder having a spilled feed receptacle for receiving any feed which birds may drop while in the process of feeding.

It is a further object of the present invention to produce a bird feeder having a feed hopper and an associated spilled feed receptacle wherein any bird excrement of a bird in the process of feeding tends to fall outside the spilled feed receptacle.

It is another object of the present invention to produce a bird feeder capable of dispensing two different types of feed, each having feed particles of different size.

It is a further object of the present invention to produce a bird feeder having a feed aperture construction which minimizes the possibility of a cavity forming in the feed around the aperture.

The above and other objects of the invention are achieved by a feeder for handling granular materials comprising a feed hopper including a first spacer wall and a second spacer wall spaced from the first spacer wall, each spacer wall having at least one feed aperture formed therein for dispensing granular materials; the feed hopper including a pair of side walls maintained in a spaced apart relationship by the first and second spacer walls and at least one pair of opposed marginal edge portions thereof extending beyond the respective first and second spacer walls; and a feed receptacle positioned below the feed hopper for collecting granular material exiting through the feed apertures.

BRIEF DESCRIPTION OF THE DRAWINGS

The objects and advantages of the present invention will become readily apparent to one skilled in the art from reading the following detailed description of the invention when considered in connection with the accompanying drawings, in which.

DETAILED DESCRIPTION OF THE PREFERRED EMBODIMENTS

Figure 1:
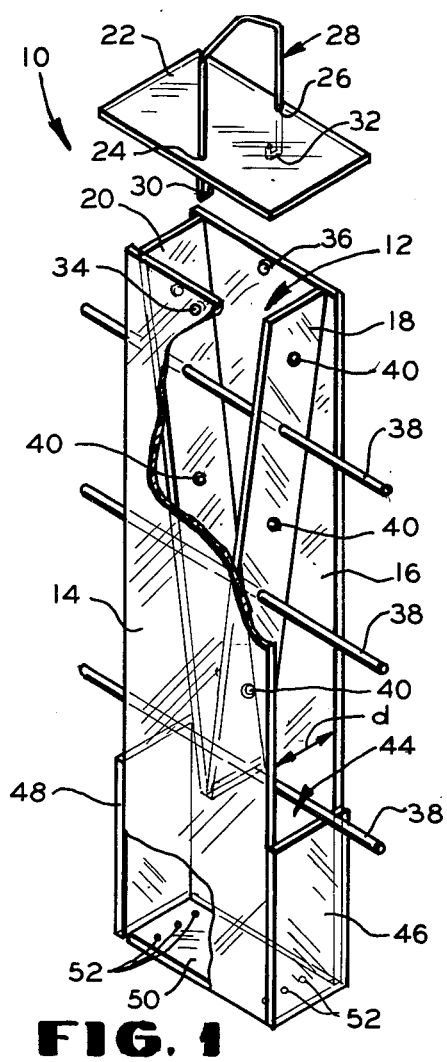
FIG. 1 is a fragmentary exploded perspective view of a bird feeder embodying the principles of the present invention.
Figure 2:
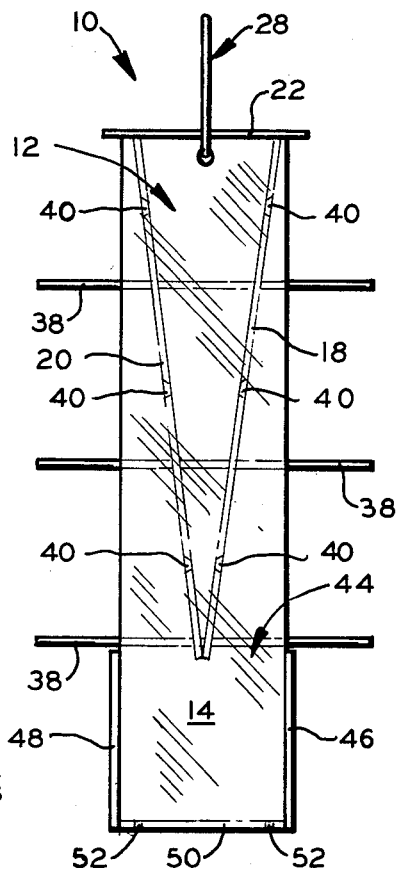
FIG. 2 is a front elevational view of the bird feeder shown in FIG. 1.
Figure 3:
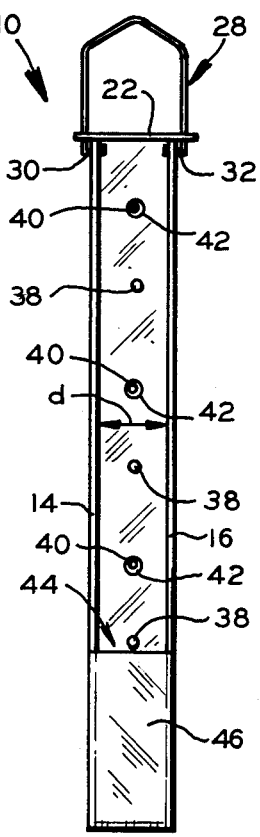
FIG. 3 is a side elevational view of the bird feeder shown in FIGS. 1 and 2.

Referring to FIGS. 1, 2 and 3, there is shown a bird feeder 10 utilizing the principal features of the present invention. A feed hopper 12 is defined by a pair of vertical side walls 14 and 16 which are maintained in generally parallel spaced relationship by spacer walls 18 and 20. The spacer walls 18 and 20 have generally parallel upper edge portions which are spaced apart a distance which approaches the width of the side walls 14 and 16. The edge portions abut one another such that the walls 18 and 20 have a generally V-shaped cross-section.

The feeder 10 includes a removable top or roof 22 in the shape of a flat rectangular sheet having sufficient dimensions to protect the feed in the hopper from rain, wind, etc. The roof 22 also functions to partially protect the birds which are in the process of feeding. The roof 22 has a pair of apertures 24 and 26 formed therein for receiving a wire hanger 28. The hanger 28 has hooked end portions 30 and 32 which are received by apertures 34 and 36 respectively which are formed in the respective side walls 12 and 14. The hanger 28 may be positioned on a suitable support member such as a tree limb.

Perches 38 are each supported by a pair of horizontally aligned apertures formed in the respective spacer walls 18 and 20. Each perch 38 provides support for a bird at each end thereof and may be constructed from an elongated cylindrical rod, such as a wooden dowel.

A separate feeding aperture 40 is formed in the spacer walls 18 and 20 a suitable distance above each perch. The feeding apertures 40 may include an outer chambered surface 42 to make it easier for a bird to access the feed in the feed hopper 12. Although only six feeding apertures and three perch members are shown in FIGS. 1, 2, and 3, it should be noted that more or less perches and apertures can be utilized as required.

The bird feeder 10 includes a spilled feed receptacle 44 which functions to catch any feed particles which the birds may drop while attempting to remove feed from the feeding apertures 40. The spilled seed receptacle 44 is defined by the lower portions of the side walls 14 and 16 and by end walls 46 and 48. The end walls 46 and 48 each have a width generally equal to the width of the spacer walls 18 and 20 and height which permits the lowest of the perches 38 to extend past the end walls 46 and 48. The receptacle 44 also includes a bottom portion 50 having a plurality of apertures 52 formed therein to function as a drainage means by permitting moisture to readily drain from the receptacle.

The side walls 14 and 16, the spacer walls 18 and 20, the end walls 46 and 48, the roof 22 and the bottom 50 are typically constructed of a plastic material such as polymethacrylate, for example. The respective walls may be sealingly attached to each other by a thermal sealing process or by use of an organic solvent, for example. Furthermore, the plastic material may be transparent as shown in FIGS. 1, 2 and 3 such as the feed level in both the hopper 12 and the receptacle 44 can easily be visually checked.

Although the bottom portion 50 shown in the drawings is formed from a flat plastic sheet which is securely attached to the lower edges of the side walls 14 and 16 and the end walls 46 and 48, it may be advantageous in some instances to form the bottom portion from a wire screen and to temporarily support the screen by inwardly extending projections formed along the lower edges of the side walls 14 and 16 and the end walls 46 and 48. This type of bottom portion would provide a means to more efficiently remove moisture from the receptacle. Also, when it is desired to empty the spilled seed receptacle 44, one would position a suitable container below the receptacle while applying an upward force to the bottom of the screen. As the screen becomes disengaged from the supporting projections, the feed falls into the container for subsequent transfer to the feed hopper.

In addition to providing a receptacle for catching any feed particles which the birds may drop, the present invention also functions to keep the feed in the receptacle free from any bird excrements. This function is accomplished by controlling the width of the spacer walls 18 and 20 which is represented in FIGS. 1 and 3 as dimension d. If this dimension is sufficiently small so as not to permit a bird to turn sideways on the perch 38 while he is feeding, any bird excrement will tend to fall outside the receptacle 44.

The feeding apertures 40 typically have an opening sufficiently large such that the feed may be removed through the aperture by a bird with the use of its beak. However, the openings of the aperture 40 are sufficiently small to maintain the feed in the feed hopper 12 when no birds are feeding. Thus, the size of the feeding apertures 40 may vary in accordance of the individual particle size of the particular feed utilized.

Figure 4:
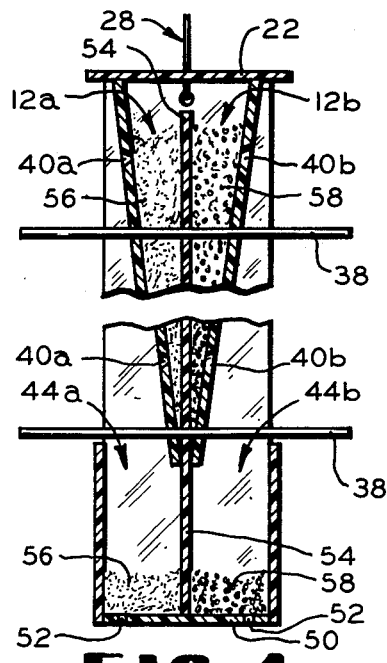
FIG. 4 is a fragmentary sectional view of an alternate embodiment of the present invention.

If it is desired to dispense two different types of feed from a single bird feeder, a central partition 54 may be used as shown in FIG. 4. The partition 54 defines a feed hopper 12a and an associated spilled feed receptacle 44a on one side and a feed hopper 12b and an associated receptacle 44b on the other side. The partition 54 extends from the bottom of the receptacles 44a and 44b to the top of the feed hoppers 12a and 12b. In FIG. 4, the hopper 12a and the receptacle 44a contain a supply of feed 56 of relatively small particle size while the hopper 12b and the receptacle 44b contain a supply of feed 58 of relatively large particle size. Hence, feed apertures 40a connected to the hopper 12a are smaller than feed apertures 40b connected to the hopper 12b. When either hopper 12a or 12b has been emptied, the respective receptacle 44a or 44b can be individually emptied and the remaining feed can be used to refill the respective hopper.

It should be noted that the bottom portion 50 shown in FIG. 4 may be replaced by the previously discussed wire screen types to provide for efficient moisture drainage. In this case, a separate wire screen bottom would be provided for each half of the receptacle such that each half can be individually emptied.

When the bird feeder 10 shown in FIGS. 1, 2, 3 and 4 is utilized in a damp environment, the moisture in the atmosphere may cause the feed particles in the hopper to partially adhere to each other. Under these conditions, after a bird has removed the feed particles proximate the respective feed aperture, there is a tendency that the cavity would be formed around the aperture and the bird would be unable to remove any more feed.

Figure 5:
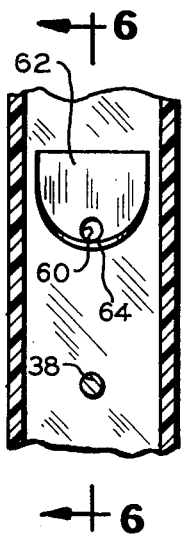
FIG. 5 is a fragmentary sectional view illustrating an alternative feed aperture construction taken along line 5—5 of FIG. 6.
Figure 6:
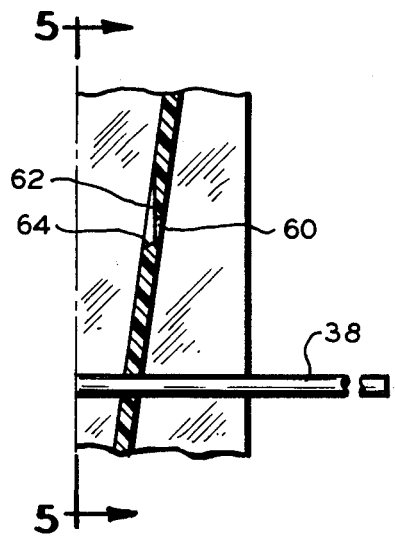
FIG. 6 is a fragmentary sectional view illustrating the alternative feed aperture construction shown in FIG. 5 and taken along line 6—6 of FIG. 5.

There is shown in FIGS. 5 and 6 a feeding aperture 60 having an inner chamfered surface construction which tends to minimize the possibility of a cavity forming around the feed aperture when the feed is damp. A wedge-shaped section is removed from the inner side of the spacer wall to form a generally vertical flat surface 62 and a lower sloped curved surface 64. This type of construction effectively uses the weight of the feed particles (not shown) above the aperture 60 to prevent any cavity from forming around the aperture 60.

In accordance with the provisions of the patent statutes, I have explained the principle and mode of operation of my invention and have illustrated and described what I now consider to represent the best embodiment. However, I desire to have it understood that within the scope of the appended claims, the invention may be practiced otherwise than as specifically illustrated and described.

What I claim is:

1. A feeder for handling granular materials comprising:
    a feed hopper including a first spacer wall and a second spacer wall, the bottom edges of said walls being connected together and the upper edges of said walls being spaced apart, said first and second spacer walls each having at least one feed aperture formed therein for dispensing granular materials; said feed hopper including a pair of side walls maintained in a spaced apart relationship by said first and second spacer walls and at least one pair of opposed marginal edge portions thereof extending beyond the respective first and second spacer walls; and
    a feed receptacle positioned below said feed hopper for collecting granular material exiting through said feed apertures.

2. The invention defined in claim 1 wherein said side walls are maintained in a generally parallel spaced relationship.

3. The invention defined in claim 2 wherein said side walls are maintained a predetermined distance apart whereby a bird in the process of feeding is not permitted to turn sideways.

4. The invention defined in claim 1 wherein said feed receptacle includes a bottom portion having drainage means formed therein.

5. The invention defined in claim 1 including a partition extending from the bottom of said receptacle to the top of said feed hopper.

6. The invention defined in claim 5 wherein said feed aperture in said first spacer wall is larger than said feed aperture in said second spacer wall.

7. The invention defined in claim 1 wherein at least one of said feed apertures has an outer chamfered edge formed on the outer side of the respective one of said spacer walls.

8. The invention defined in claim 1 wherein at least one of said feed apertures has a chamfered surface formed adjacent said feed aperture on the inner side of the respective one of said spacer walls.

9. The invention defined in claim 1 including a perch positioned below at least one of said feed apertures.

10. The invention defined in claim 1 including a removable roof positioned above said feed hopper.

* * * * *